United States Patent [19]
Nishino et al.

[11] Patent Number: 5,868,033
[45] Date of Patent: Feb. 9, 1999

[54] CONTROL SYSTEM PROHIBITING A MANUAL SHIFT FOR USE IN AUTOMATIC TRANSMISSIONS

[75] Inventors: Kenji Nishino, Isehara; Hirofumi Michioka, Fujisawa, both of Japan

[73] Assignee: Nissan Motor Co., Ltd., Yokohama, Japan

[21] Appl. No.: 812,781

[22] Filed: Mar. 6, 1997

[30] Foreign Application Priority Data

Mar. 7, 1996 [JP] Japan .................................... 8-049889

[51] Int. Cl.[6] ..................................... F16H 59/04
[52] U.S. Cl. ......................... 74/335 R; 74/336 R; 477/97
[58] Field of Search ................................ 74/335, 336 R; 477/97, 77

[56] References Cited

FOREIGN PATENT DOCUMENTS 7-83327  3/1995  Japan .

OTHER PUBLICATIONS

Mar. 1987 Maintenance Manual of RE4R01A Type Full–Range Electronically Controlled Automatic Transmissions (A261C07) published by Nissan Motor Co., Ltd.

*Primary Examiner*—Khoi Q. Ta
*Attorney, Agent, or Firm*—Foley & Lardner

[57] ABSTRACT

A manual shift control system for automatic transmissions is so constructed as to carry out automatic shift control when a motor vehicle is found in the operation area where selection of a manual speed ratio is not allowed. Acceptance of the manual upshift or downshift command is prohibited until a predetermined time elapses after occurrence of automatic shift.

12 Claims, 5 Drawing Sheets

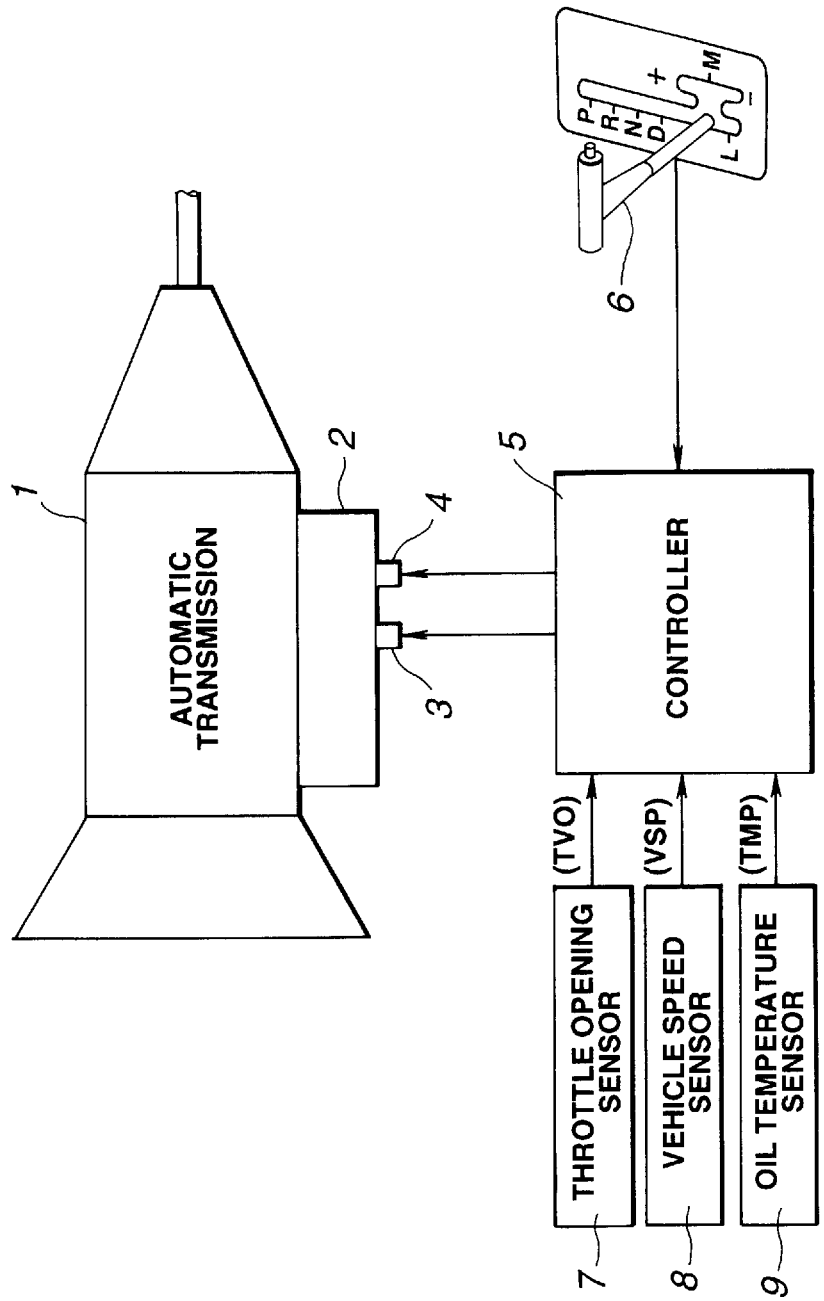

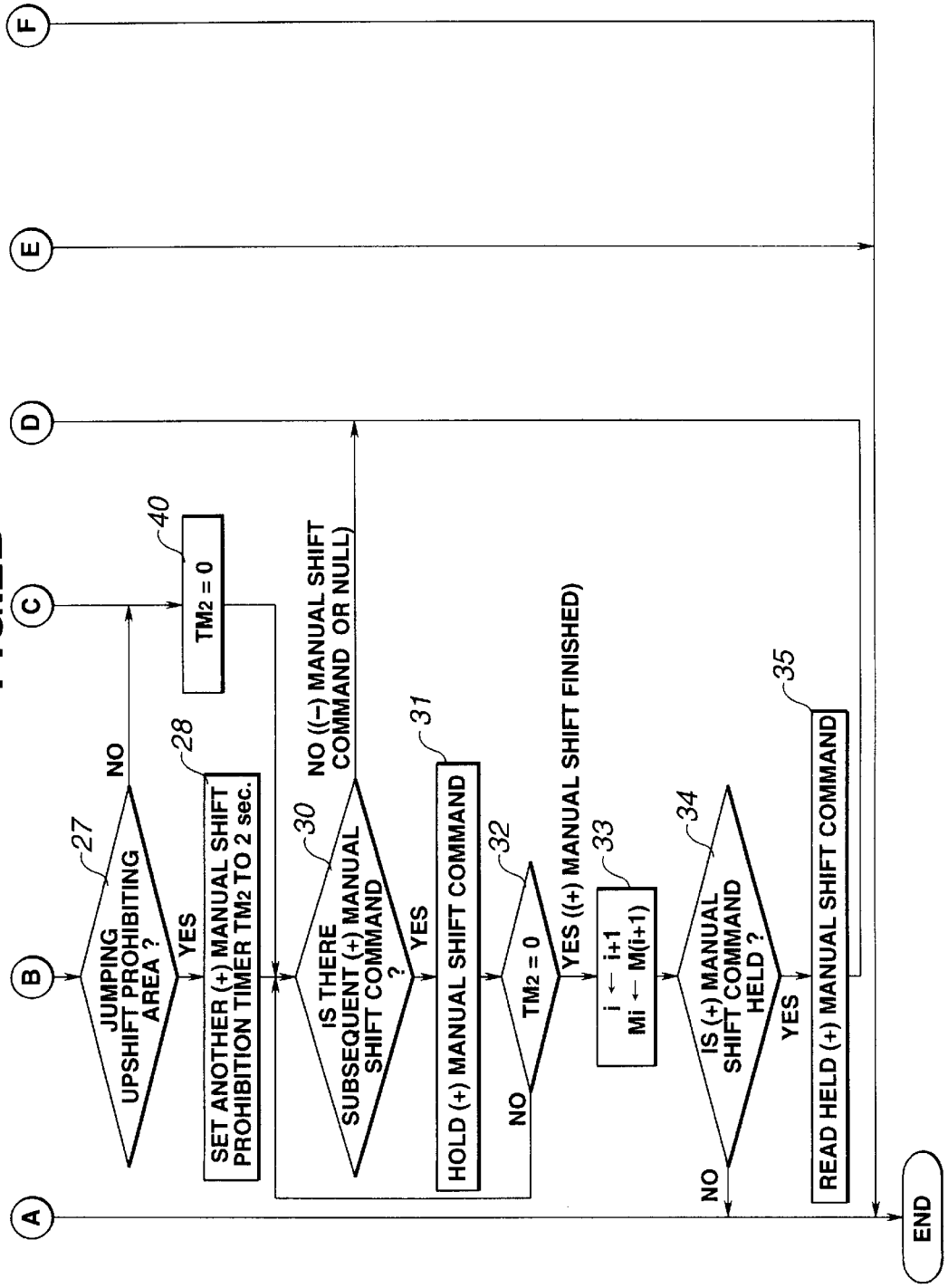

CONTROL SYSTEM PROHIBITING A MANUAL SHIFT FOR USE IN AUTOMATIC TRANSMISSIONS

BACKGROUND OF THE INVENTION

The present invention relates generally to an automatic transmission of a motor vehicle that allows manual shift and more particularly, to a manual shift control system for use therein.

With the automatic transmission that allows manual shift, if shifting to a speed ratio corresponding to a manual shift command is carried out without taking account of the vehicle cruising state, the following problem arises. When providing a manual shift command to a low speed ratio at high vehicle speed, the engine falls in over-rotation, whereas, when providing a manual shift command to a high speed ratio at low vehicle speed, engine vibrations are transmitted to a vehicle body.

Generally, as disclosed, for example, in JP-A 7-83327, a shift pattern for each speed ratio corresponding to a manual shift command is determined with the operation area wherein selection of a corresponding speed ratio is not allowed. In this operation area, automatic shift is carried out instead of manual shift so as not to produce the above problem.

With the known structure, however, since a upshift or downshift manual shift command is accepted even during execution of automatic shift in the manual range, manual shift corresponding thereto is carried out besides automatic shift, causing the following problem:

By way of example, if automatic shift in the manual range aims to prevent over-rotation at high vehicle speed, it naturally concerns upshift transmission for decreasing the engine speed. When a driver, who does not know this automatic shift, wants shifting to one-stage higher speed, he carries out an operation to provide a upshift manual shift command. At that time, the known structure ensures shifting of upshift transmission due to automatic shift plus upshift transmission corresponding to a upshift manual shift command. As a result, though the driver wants shifting to one-stage higher speed, shifting to two-stage higher speed is carried out. The driver has to then carry out an operation to provide a downshift manual shift command, resulting in a troublesome operation.

The foregoing is an inconvenience in the operation area wherein selection of a corresponding speed ratio is not allowed in the manual range. With the known structure, even in the operation area wherein selection of a corresponding speed ratio should be allowed, the following problem arises when upshift manual shift commands are provided consecutively:

If upshift manual shift commands are provided consecutively, the automatic transmission cannot ensure shifting to a final speed ratio through sequential progress of speed ratios corresponding thereto due to a shift response lag, but substantially so-called jump shifting that a current speed ratio abruptly proceeds to a final speed ratio. This jump shifting accompanies a great variation in the engine speed, so that friction elements such as clutch put in engagement upon shifting should absorb corresponding rotational energy, increasing the heat amount of the friction elements, causing overheat thereof. This inconvenience is remarkable as the vehicle speed is higher.

It is, therefore, an object of the present invention to provide a manual shift control system for use in automatic transmissions, which is free from the above problems, and enables easy and excellent manual shift.

SUMMARY OF THE INVENTION

According to one aspect of the present invention, there is provided a shift control system for an automatic transmission of a motor vehicle, the transmission being shiftable to a manual speed ratio when manual upshift and downshift commands are provided, the system comprising:

means for carrying out an automatic shift control when the motor vehicle is found in an operation area where selection of a manual speed ratio is not allowed; and means for prohibiting acceptance of said one of the manual upshift and downshift commands until a predetermined time elapses after occurrence of an automatic shift.

Another aspect of the present invention lies in providing a method of controlling an automatic transmission of a motor vehicle, the transmission being shiftable to a manual speed ratio when manual upshift and downshift commands are provided, the method comprising the steps of:

carrying out an automatic shift control when the motor vehicle is found in an operation area where selection of a manual speed ratio is not allowed; and prohibiting acceptance of said one of the manual upshift and downshift commands until a predetermined time elapses after occurrence of an automatic shift.

BRIEF DESCRIPTION OF THE DRAWINGS

FIG. 1 is a block diagram showing an embodiment of a manual shift control system for use in automatic transmissions according to the present invention;

FIGS. 2A and 2B are flowcharts showing the operation of the embodiment;

DETAILED DESCRIPTION OF THE INVENTION

Figure 2A:
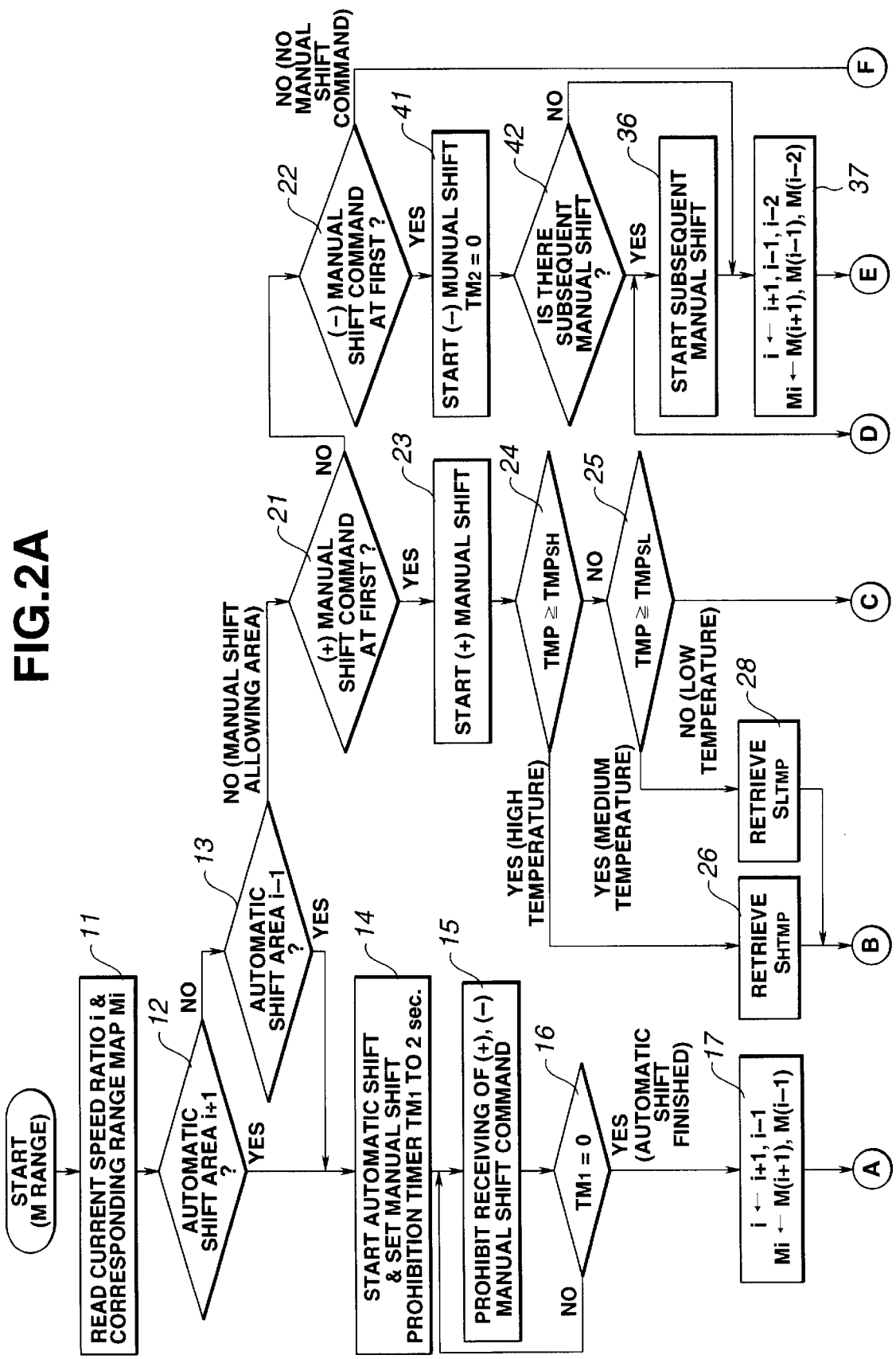

Referring first to FIG. 1, there is shown an embodiment of a manual shift control system for use in automatic transmissions. An automatic transmission 1, which is fundamentally the same as that described in the Maintenance Manual of RE4R01A Type Full-Range Electronically Controlled Automatic Transmissions (A261C07) published by Nissan Motor Co., Ltd. in March, 1987, includes first and second shift solenoids 3, 4 arranged in a control valve 2, combination of turn-on and turn-off of, which allows selection of the first to forth speeds.

Turn-on and turn-off of the shift solenoids 3, 4 are controlled by a controller 5. The controller 5 receives a position signal out of a shift lever 6 operated by a driver, a signal out of a throttle opening sensor 7 for detecting an engine throttle-valve opening degree TVO, a signal out of a vehicle speed sensor 8 for detecting a vehicle speed VSP, and an oil temperature sensor 9 for detecting a temperature TMP of operating oil of the automatic transmission 1.

A supplementary explanation of the shift lever 6 will be made. As is known in the above document, the shift lever 6 has a parking (P) range position, a reverse (R) range position, a neutral (N) range position, a forward automatic shift (D) range position, and an engine brake (L) range position arranged on a straight line, and a manual shift (M) range position arranged offset from the straight line. In the manual shift (M) range position, the shift lever 6 is resiliently supported between a upshift (+) position and a downshift (−) position in a self-reset way. The driver puts the shift lever 6 in the upshift (+) position whenever he wants upshift transmission to one-stage higher speed, and in the downshift (−) position whenever he wants downshift transmission to one-stage lower speed, providing a manual shift command to the controller 5.

The controller 5 executes the following shift control in accordance with the above input information. In the P, R, N, D and L ranges, the controller 5 carries out substantially the same shift control as that described in the above document. It is noted that the above document refers to the L range as 1 range.

Figure 3A:
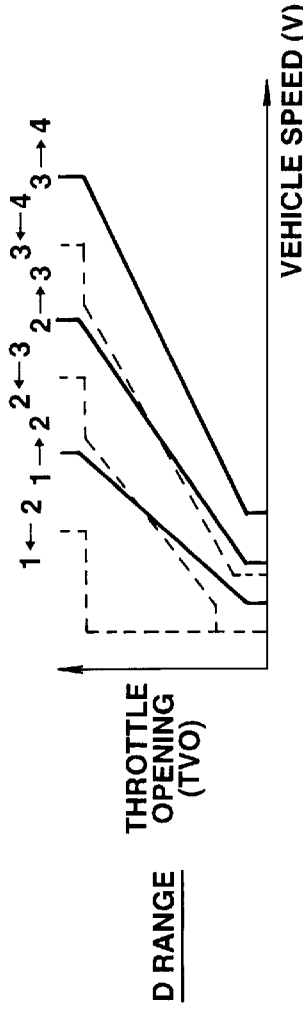
FIG. 3A is a diagrammatic view showing a shift control pattern in the automatic shift (D) range.

Typical shift control in the D range will be described. With a control program, not shown, and in accordance with a shift map as shown in FIG. 3A wherein upshift transmission lines are given by fully-drawn lines, and downshift transmission lines are given by broken lined, the controller 6 retrieves an appropriate speed ratio out of the vehicle speed VSP and the throttle-valve opening degree TVO. Next, it is determined whether or not a currently selected speed ratio corresponds to the appropriate speed ratio. If the answer is no, turn-on and turn-off of the shift solenoids 3, 4 are switched to obtain shifting to the appropriate speed ratio, whereas if the answer is yes, turn-on and turn-off thereof are maintained in the current state to carry out shift control in accordance with the D-range shift map as shown in FIG. 3A.

If the driver wants manual shift to put the shift lever 6 in the M range position, the controller 5 executes a control program as shown in FIG. 2 to carry out manual shift control in the M range. It is noted that the description refers hereafter to selection of the first speed in the M range as M1 range, selection of the second speed in the M range as M2 range, selection of the third speed in the M range as M3 range, selection of the fourth speed in the M range as M4 range, and shift maps used upon the above selections as M1 to M4 range maps.

First, at step 11, a currently selected speed ratio i and a manual shift range map Mi corresponding thereto are read in a memory. The manual range shift range map Mi (M1, M2, M3 or M4 range map) is as shown in FIGS. 3B, 3C, 3D or 3E wherein a hatched part corresponds to the operation area wherein selection of a corresponding speed ratio is not allowed. A high vehicle-speed side portion thereof corresponds to the operation area wherein upshift transmission by automatic shift is needed to prevent over-rotation of the engine when selecting a corresponding speed ratio, whereas a low vehicle-speed side portion thereof corresponds to the operation area wherein downshift transmission by automatic shift is needed to prevent vibrations of a vehicle body due to engine rotation when selecting a corresponding speed ratio.

At steps 12, 13, it is determined whether or not the vehicle cruising state is found in the hatched operation area (automatic shift area) in accordance with the manual shift map Mi read at the step 11. Moreover, if it is determined whether the vehicle cruising state is found in the upshift (i+1) transmission area or the downshift (i−1) transmission area. At step 14, turn-on and turn-off of the shift solenoids 3, 4 are switched to start automatic shift, and a manual shift prohibition timer $TM_1$ is set to a predetermined time, e.g. to 2 sec. The timer $TM_1$ is automatically reset to 0 after a lapse of the predetermined time corresponding, preferably, to a time required to automatic shift.

At step 15, until it is determined at a step 16 that the manual shift prohibition timer $TM_1$ is reset to 0, i.e., until the predetermined time elapses after start of automatic shift or during execution of automatic shift, acceptance of a manual shift command is prohibited or rejected, which is given by the driver who wants upshift transmission to one-stage higher speed to put the shift lever 6 in the upshift (+) position, or wants downshift transmission puts one-stage lower speed to put the shift lever 6 in the downshift (−) position. At step 17, after a lapse of the predetermined time after start of automatic shift, i.e., after completion of automatic shift, a parameter i indicative of a current speed ratio is updated to i +1 upon upshift transmission, and i−1 upon downshift transmission. Moreover, the manual shift range map Mi is updated to M(i+1) upon upshift transmission, and M(i+1) upon downshift transmission.

As described above, a manual shift command provided by the driver is not accepted until automatic shift is completed. This is carried out when the vehicle cruising state is found in the operation area. The selection of a manual speed ratio corresponding to the manual shift command is not allowed, so that an inconvenience can be avoided by shifting in the same direction in response to a manual shift command. The automatic shift ensures shifting corresponding to the manual shift command.

At the steps 12, 13, if it is determined that the vehicle cruising state is not found in the hatched operation area (automatic shift area), but in the operation area wherein selection of a manual speed ratio corresponding to a manual shift command is allowed, control proceeds to steps 21, 22. At the steps 21, 22, it is determined whether or not a manual shift command is provided. And if the answer is yes, it is determined whether provided at first is a upshift (+) manual shift command or a downshift (−) manual shift command.

At the step 21, if it is determined that a upshift (+) manual shift command is provided at first, control proceeds to a step 23 where turn-on and turn-off of the shift solenoids 3, 4 are switched to correspond to the manual shift command, starting shifting to one-stage higher speed. At subsequent steps 24, 25, it is determined whether the transmission operating-oil temperature TMP is higher than a predetermined high temperature $TMP_{SH}$, or between the predetermined high temperature $TMP_{SH}$ and a predetermined low temperature $TMP_{SL}$, or lower than the predetermined low temperature $TMP_{SL}$.

Figure 3B:
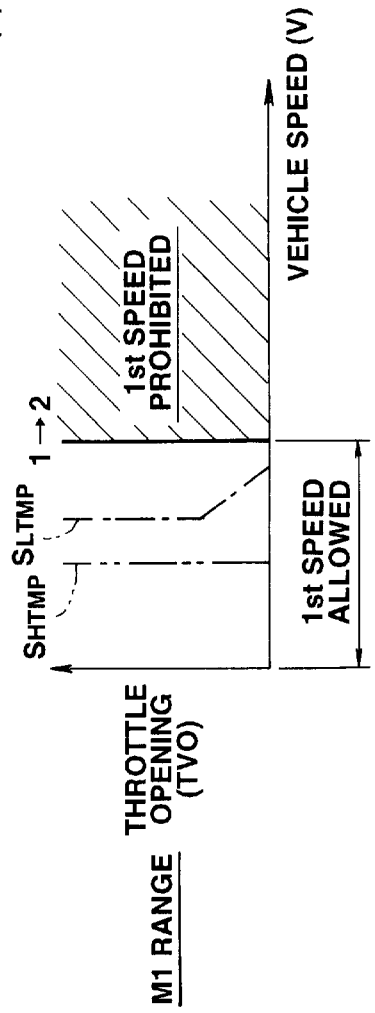
FIG. 3B is a view similar to FIG. 3A, showing a shift control pattern in the first-speed manual shift (M1) range.
Figure 3C:
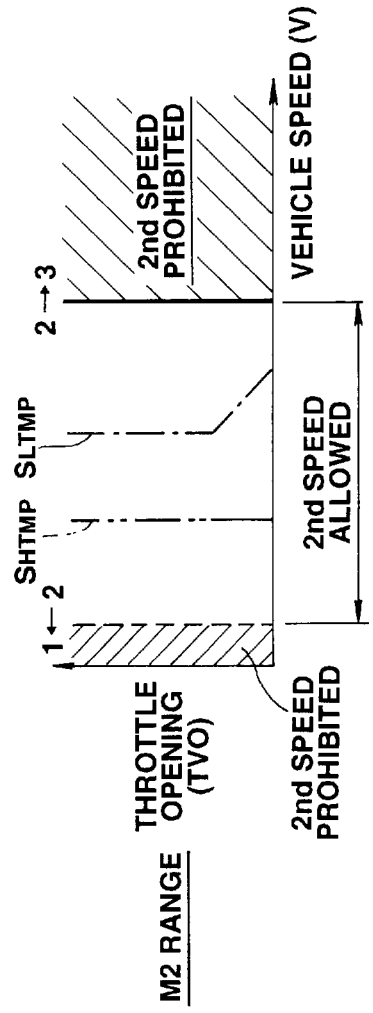
FIG. 3C is a view similar to FIG. 3B, showing a shift control pattern in the second-speed manual shift (M2) range.
Figures 3D, 3E:
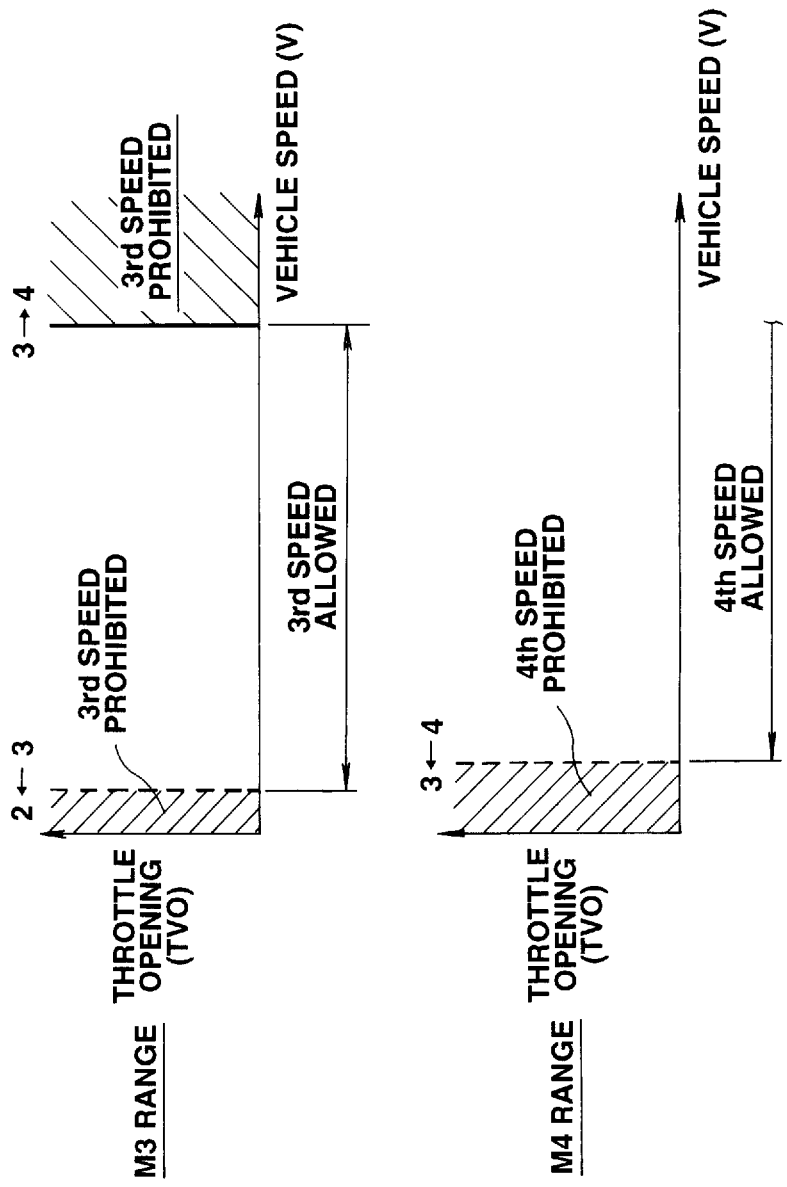
FIG. 3D is a view similar to FIG. 3C, showing a shift control pattern in the second-speed manual shift (M3) range.
FIG. 3E is a view similar to FIG. 3D, showing a shift control pattern in the second-speed manual shift (M4) range.

The predetermined temperatures $TMP_{SH}$, $TMP_{SH}$, are illustrated only in FIGS. 3B and 3C showing the M1 and M2 range maps, and indicated by two-dot chain lines $S_{HTMP}$ and one-dot chain lines $S_{LTMP}$. Each predetermined temperature $TMP_{SH}$, $TMP_{SH}$ is a reference temperature for determining in each manual shift range map a boundary line as to whether jump upshift transmission is allowed or prohibited.

Each two-dot chain line $S_{HTMP}$ is a boundary line when the transmission operating-oil temperature TMP is higher than the predetermined high temperature $TMP_{SH}$. The higher vehicle-speed side area with respect to this line, which concerns a problem of overheat by jump upshift transmission under the above temperature conditions, is made a jump upshift-transmission prohibition area.

On the other hand, each one-dot chain line $S_{LTMP}$ is a boundary line when the transmission operating-oil temperature TMP is between the predetermined high temperature $TMP_{SH}$ and the predetermined low temperature $TMP_{SL}$. The higher vehicle-speed side area with respect to this line, which concerns a problem of overheat by jump upshift transmission under the above temperature conditions, is made a jump upshift-transmission prohibition area.

When the transmission operating-oil temperature TMP is lower than the predetermined low temperature $TMP_{SL}$, no problem of overheat by jump upshift transmission occurs, so that a jump upshift-transmission prohibition area is not made.

Therefore, at the step 24, if it is determined that $TMP \geq TMP_{SH}$, control proceeds to step 26 where the boundary line $S_{HTMP}$ is retrieved, in accordance with which, at step 27, it is determined out of the throttle-valve opening degree TVO and the vehicle speed VSP whether or not the vehicle cruising state is found in the jump upshift-transmission prohibition area. On the other hand, at the step 25, it is determined that $TMP \geq TMP_{SL}$, control proceeds to step 28 where the boundary line $S_{LTMP}$ is retrieved, in accordance with which, at the step 28, it is determined out of the throttle-valve opening degree TVO and the vehicle speed VSP whether or not the vehicle cruising state is found in the jump upshift-transmission prohibition area.

At the step 27, if it is determined that the vehicle cruising state is found in the jump upshift-transmission prohibition area, control proceeds to step 29 where an another-upshift manual shift prohibition timer $TM_2$ is set to a predetermined time, e.g., 2 sec. The timer $TM_2$ is automatically reset to 0 after a lapse of the predetermined time corresponding, preferably, to a time required to manual upshift transmission corresponding to the first upshift (+) manual shift command.

At step 30, it is determined whether or not a subsequent upshift (+) manual shift command is provided. If a subsequent upshift (+) manual shift command is provided, control proceeds to a step 31 where it is temporarily maintained to prohibit jump upshift transmission, and not to start a corresponding upshift transmission immediately. At step 32, if it is determined that the another-upshift manual shift prohibition timer $TM_2$ is reset to 0, i.e., manual upshift transmission corresponding to the first upshift (+) manual shift command is completed, control proceeds to steps 33–37 where manual upshift transmission corresponding to a subsequent manual upshift (+) shift command is carried out.

Specifically, at the step 33, in response to completion of manual upshift transmission corresponding to the first upshift (+) manual shift command as described above, the parameter i indicative of a current speed ratio is updated to i+1, and the manual shift range map Mi is updated to M(i+1). At the step 34, it is confirmed that the upshift (+) manual shift command is maintained, which, at the step 35, is read in the memory. At the step 36, shifting corresponding to the read upshift (+) manual shift command or subsequent upshift manual shift command is started by switching of turn-on and turn-off of the solenoids 3, 4. At the subsequent step 37, the parameter i indicative of a current speed ratio is updated to i+1, and the manual shift range map Mi is updated to M(i +1).

As described above, though with a difference between control when determining at the step 24 that $TMP \geq TMP_{SH}$ and control when determining at the step 25 that $TMP \geq TMP_{SL}$, if the vehicle cruising state is found in the jump upshift-transmission prohibition areas located on the higher vehicle-speed side with respect to the boundary lines $S_{HTMP}, S_{LTMP}$, upshift transmission is carried out in accordance with a subsequent upshift (+) manual shift command after a lapse of the predetermined time of 2 sec. set in the another-upshift manual shift prohibition timer $TM_2$, i.e. after completion of shifting in accordance with the first upshift (+) manual shift command. Thus, even if upshift (+) manual shift commands are provided consecutively, sequential shifting is always carried out with no substantial jump shifting being carried out, preventing the problem: If jump shifting is carried out in the above areas, a great variation in the engine speed is produced, so that friction elements such as clutch put in engagement upon shifting should absorb corresponding rotational energy, increasing the heat amount of the friction elements, causing overheat thereof.

Further, as seen from comparison of FIGS. 3B and 3C, since the boundary lines $S_{HTMP}, S_{LTMP}$ are positioned on the lower vehicle-speed side as the transmission operating-oil temperature TMP is higher, the jump shifting prohibition area located on the higher vehicle-speed side with respect to the boundary lines is wider as the transmission operating-oil temperature is higher, resulting in more perfect achievement of the above effect in view of the fact that the problem of overheat is remarkable as the transmission operating-oil temperature is higher.

Furthermore, since the boundary line $S_{LTMP}$ is positioned on the higher vehicle-speed side as the throttle-valve opening degree TVO is smaller as shown in FIGS. 3B and 3C, the jump shifting prohibition area is narrower as the throttle-valve opening degree is smaller, resulting in minimizing of jump shifting required by the driver in view of the fact that the problem of overheat is unremarkable as the transmission operating-oil temperature is higher.

If it is determined at the step 25 that $TMP < TMP_{SL}$ and thus the problem of overheat does not occur, or if it is determined at the step 27 that the vehicle cruising state is not found in the jump upshift-transmission prohibition area, control proceeds to step 40 where the another-upshift manual shift prohibition timer $TM_2$ is reset to 0. Thus, insofar as it is determined at the step 30 that a subsequent upshift (+) manual shift command is provided, control proceeds to the steps 33–37 without returning to the step 30 from the step 32. As a result, if upshift (+) manual shift commands are provided by the driver who wants jump shifting, manual upshift transmission can be carried out from a currently selected speed ratio to a speed ratio corresponding to the last shift command.

At the step 30, if it is determined that a subsequent upshift (+) manual shift command, i.e., a subsequent manual shift command is a downshift (−) manual shift command, or no subsequent manual shift command is provided, control skips the steps 31–35, and proceeds to the steps 36, 37, enabling execution of immediate shifting corresponding to the downshift (−) manual shift command, or no execution of shifting in response to no generation of a subsequent manual shift command. As for update of the parameter i indicative of a speed ratio and the manual range map Mi at the step 37, it is not necessary to update the two in the former case, whereas it is necessary to update the parameter i to i+1, and the manual range map Mi to M(i+1) in the latter case.

At the step 22, if it is determined that a downshift (−) manual shift command is provided at first, control proceeds to a step 41 where turn-on and turn-off of the shift solenoids 3, 4 are switched to correspond to the manual shift command, starting shifting to one-stage lower speed. Moreover, the another-upshift manual shift prohibition timer $TM_2$ is reset to 0. At a subsequent step 42, it is determined whether or not a subsequent downshift (−) or upshift (+) manual shift command is provided. If the answer is no, control proceeds to the step 37 where the parameter i indicative of a speed ratio is updated to i−1, and the manual range map Mi is updated to M(i−1).

At the step 42, if it is determined that a subsequent downshift (−) manual shift command is provided, control proceeds to the step 36 where turn-on and turn-off of the shift solenoids 3, 4 are switched to correspond to the manual shift command, starting shifting to one-stage lower speed. And at the step 37, the parameter i indicative of a speed ratio is updated to i−2, and the manual range map Mi is updated to M(i −2).

On the other hand, at the step 42, if it is determined that a subsequent downshift (+) manual shift command is provided, control proceeds to the step 36 where turn-on and turn-off of the shift solenoids 3, 4 are switched to correspond to the manual shift command, starting shifting to a higher speed to put a speed ratio in the former state. And at the step 37, the parameter i indicative of a speed ratio and the manual range map Mi are not updated.

At the step 22, if it is determined that a manual shift command is not provided, i.e., the shift lever 6 is put in the manual shift range (M) position, but is not yet operated to provide a upshift (+) or downshift (−) manual shift command, control comes to an end.

As described above, in the operation area wherein no problem of overheat arises, upshift or downshift transmission can be carried out in accordance with a manual shift command provided by the driver. If manual shift commands in the same direction are provided consecutively, jump shifting to a speed ratio corresponding to the last manual shift command can be made due to a shift response lag. It will be thus understood that the automatic transmission, which allows manual shift, is completely free from the above problems without losing its special property.

Having described the present invention in connection with the preferred embodiment, it is noted that the present invention is not limited thereto, and various changes and modifications can be made without departing from the spirit of the present invention.

What is claimed is:

1. A shift control system for an automatic transmission of a motor vehicle, the transmission being selectably shiftable manually with upshift and downshift commands, the system comprising:

means for automatically controlling the transmission when the transmission is operating in a condition where manual shifting is not allowed; and means for prohibiting acceptance of the manual upshift and downshift commands until a predetermined time elapses after occurrence of an automatic shift.

2. A shift system as claimed in claim 1, further comprising means for prohibiting, when upshift commands are provided consecutively and when the vehicle is at a speed higher than a predetermined speed, a subsequent manual upshift until completion of a previous manual upshift.

3. A shift control system as claimed in claim 1, wherein said predetermined time corresponds to a time required for completion of said automatic shift.

4. A shift control system as claimed in claim 2, wherein said predetermined speed is lower as a temperature of operating oil of the transmission is higher.

5. A shift control system as claimed in claim 4, wherein said predetermined speed is higher as an engine throttle-valve opening degree is smaller.

6. A method of controlling an automatic transmission of a motor vehicle, the transmission being selectably shiftable manually with upshift commands, the method comprising:

automatically shifting the transmission when the motor vehicle is operating in a condition where manual shifting is not allowed; and prohibiting acceptance of either of the manual upshift and downshift commands until a predetermined time elapses after occurrence of an automatic shift.

7. A method as claimed in claim 6, further comprising:

prohibiting, when manual upshift commands are provided consecutively and when the vehicle is at a speed higher than a predetermined speed, a subsequent manual upshift until completion of previous manual upshift.

8. A method as claimed in claim 6, wherein said predetermined time corresponds to a time required for completion of said automatic shift.

9. A method as claimed in claim 7, wherein said predetermined speed is lower as a temperature of operating oil of the transmission is higher.

10. A method as claimed in claim 9, wherein said predetermined speed is higher as an engine throttle-valve opening degree is smaller.

11. A shift control system for an automatic transmission, the transmission being selectably shiftable manually with upshift and downshift commands, the system comprising:

means for prohibiting, when manual upshift commands are provided consecutively and when the vehicle is at a speed higher than a predetermined speed, a subsequent manual upshift until completion of a previous manual upshift.

12. A method of controlling an automatic transmission, the transmission being selectably shiftable manually with upshift and downshift commands, the method comprising:

prohibiting, when manual upshift commands are provided consecutively and when the vehicle is at a speed higher than a predetermined speed, a subsequent manual upshift until completion of a previous manual upshift.

* * * * *